(12) United States Patent
Nakajima et al.

(10) Patent No.: US 6,438,098 B1
(45) Date of Patent: Aug. 20, 2002

(54) OPTICAL RECORDING MEDIUM, MEDIA TRACKING METHOD AND RECORDING/ REPRODUCING APPARATUS

(75) Inventors: Junsaku Nakajima, Kashihara; Masaru Nomura, Nabari; Hitoshi Takeuchi, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/706,825

(22) Filed: Nov. 7, 2000

(30) Foreign Application Priority Data

Dec. 22, 1999 (JP) .......................... 11-364683
Feb. 23, 2000 (JP) ........................ 2000-046242

(51) Int. Cl.$^7$ ................................. G11B 7/00
(52) U.S. Cl. ............... 369/275.4; 369/275.1; 369/47.1; 369/53.1
(58) Field of Search .................. 369/44.11, 44.13, 369/44.23, 44.26, 44.27, 44.28, 44.34, 47.1, 47.11, 47.28, 53.1, 53.2, 53.28, 53.34, 53.41, 59.1, 59.11, 59.25, 275.1, 275.3, 275.4

(56) References Cited

U.S. PATENT DOCUMENTS 5,978,327 A * 11/1999 Kuroda et al. ........... 369/44.26
6,226,257 B1 * 5/2001 Morimoto ................ 369/275.4

FOREIGN PATENT DOCUMENTS

JP        11-73686 A        3/1999

* cited by examiner

Primary Examiner—Muhammad Edun

(57) ABSTRACT

An optical recording medium capable of obtaining a large reproduced signal from the recoded mark, a large reproduced signal of a pre-pit and a large tracking signal both in an area of the grooves and an area of the pre-pits, which provides a sufficient time allowance for switching tracking to that suitable for the area of the grooves or to that suitable for the area of the pre-pits. An optical recording medium comprising a substrate whereon tracks each comprising at least of writable grooves and pre-pits deeper than or equal to the grooves are formed and areas of a relatively shallow pits are each provided between an area of the deep pits and an area of the grooves. The depth Dg of the grooves, the depth Dsp of the shallow pits and the depth Ddp of the deep pits satisfy the following conditions: Dg<λ/(8n), λ/(8n)<Ddp<λ/(4n) and Dg≦Dsp<Ddp. Tracking method is switched over in the shallow pit area when recording or reproducing information on the optical recoding medium.

23 Claims, 10 Drawing Sheets

OPTICAL RECORDING MEDIUM, MEDIA TRACKING METHOD AND RECORDING/REPRODUCING APPARATUS

BACKGROUND OF THE INVENTION

The present invention relates to a writable and rewritable optical recording medium, a tracking method for the medium and an optical recording/reproducing apparatus for recording and reproducing information on/from the optical recording medium.

Recently, writable and rewritable optical discs, which are used as storage means for personal computers and as package media for music and video information, have been developed to achieve higher recording density.

Each optical disc has a writable and rewritable area and a pre-pit area previously formed as a pit thereon for storing information that must not be erased.

Portions other than the pre-pit area are writable areas in which "grooves (track)" and "lands (not track)" are formed.

A typical structure of a conventional optical disc is shown in FIGS. 1 and 2. FIG. 1 is a plan view and FIG. 2 is a perspective, partly in cross-section, of the optical disc.

In FIG. 2, G denotes a groove, L denotes a land and PP denotes a preformed pit (hereinafter referred to as pre-pit). A laser light beam 3 is collected by an objective lens 2 and illuminates the recording surface of the disc through a substrate 1. The grooves G are nearer to the objective lens 2 than the lands L. The lands L, grooves G and pre-pits PP are coated with a recording layer (not shown) made of magneto-optical material or phase-change material or photosensitive dye material. In the shown case, record marks M are recorded in grooves. This is because marks recorded in grooves can achieve higher quality of reproduced signal than marks recorded on lands between the grooves.

The following is an example of a method for optimally selecting a depth of the groove G and a depth of the pre-pit PP to be formed on an optical disk.

The example represents the experimental results made on optical discs, which have the same track pitch (inter-groove distance) of 0.74 microns but differ from each other by their groove depth Dg and pre-pit depth Dp, by using an optical system composed of a laser emitting a light beam of a wavelength $\lambda=650$ nm and an objective lens NA0.6. The groove G and the pre-pit PP are of 0.35 microns in width. The recording layer made of phase-change material InAgSbTe was applied. The recording and reproducing were carried out by rotating each disc at a linear velocity of 3.5 m per second.

FIG. 3 shows amplitudes of reproduced signals obtained, respectively, from marks recorded in grooves of different depths Dg and from pre-pits having different depths Dp.

More specifically, a number of optical discs having different groove depths Dg and different pre-pit depths Dp were subjected to measurements of amplitudes of reproduced signals obtained from 0.3 micron long marks recorded in grooves G and amplitudes of reproduced signals obtained from 0.3 micron long pre-pit.

The measurement results shown in FIG. 3 indicate that the marks recorded in shallower grooves have larger amplitude of reproduced signals, i.e., better S/N ratios. This means that it is preferable to decrease the depth Dg of groves G to improve the S/N ratio of reproduced signals of marks thereof. This offers a great advantage in particular for discs of higher recording density.

On the other hand, tracking of a light beam focused on groove G is needed to achieve orderly recording information in the form of marks M in the grooves G and precisely reproducing the information. For this reason, the depth of the grooves G must be decided in view of an amplitude characteristic of a signal reproduced from the mark and an amplitude characteristic of tracking signal (i.e., a push-pull signal) obtained on the basis of an average intensity distribution of light components reflected in a direction perpendicular to a direction of the grooves G.

FIG. 4 is a graph showing the dependence of amplitudes of push-pull signals obtained from grooves G and from pre-pits PP upon groove depth Dg and pre-pit depth Dp respectively.

In the graph, $\lambda$ denotes a wavelength of a light beam and n denotes a refractive index of a substrate of an optical recording medium.

As seen from the graph, the maximal amplitude of the push-pull signal can be obtained when the groove depth Dg or the pre-pit depth Dp is equal to $\lambda/(8n)$. This means that the grooves G having the depth Dg of $\lambda/(8n)$ are desired for obtaining push-pull signals being large enough to achieve the precise tracking. However, in view of the amplitude of the reproduced signal obtained from a mark, it is preferable to select the groove depth Dg being smaller than $\lambda/(8n)$. For example, a depth value indicated by A in FIGS. 3 and 4 is about 20 nm at $\lambda=650$ nm and n=1.5 and it is preferable to obtain a large push-pull signal as well as an improved S/N ratio of the reproduced signal of the mark.

On the other hand, it is found from the relationship between the pre-pit depths Dp and amplitudes of reproduced pre-pit signals (FIG. 3) that the amplitude of the reproduced prepit signal can achieve a maximal value at the pre-pit depth Dp of $\lambda/(4n)$ and decreases as the pre-pit depth Dp decreases. Hence, a depth value B (about 100 nm in FIGS. 3 and 4) may be selected as the pre-pit depth Dp. This selection, however, may be accompanied by decreasing the amplitude of the push-pull signal at the pre-pit depth of about $\lambda/(4n)$ as shown in FIG. 4. Namely, it is difficult to increase both the amplitude of the reproduced pre-pit signal and the amplitude of the pre-pit push-pull signal.

In other words, it is difficult to use the push-pull signals for tracking in the pre-pit areas. Therefore, the use of differential phase detection (DPD) method, which is different from the push-pull method by its detection principle, is desirable for tracking in the pre-pit area. This method obtains information necessary for tracking by detecting a change of a refraction pattern of light beam illuminating the surface of the optical recording medium (optical disk) and reflected therefrom, or by detecting the differential phase of the refraction pattern change.

FIG. 5 shows the relationship between the depths Dp of pre-pits and the amplitudes of DPD signals obtained from the pre-pits.

As shown in FIG. 5, the DPD method is suited to tracking in the pre-pit areas since it can obtain a large-amplitude tracking signal from pre-pits having the depth Dp of about $\lambda/(4n)$, at which the tracking signal obtained by the pushpull method has a very small amplitude.

Returning to FIG. 1, problems involved in an optical recording medium having grooves and pre-pits will be discussed. FIG. 1 is a plan view of an optical recording medium constructed of grooves G having the depth Dg of A and pre-pits PP having the depth Dp of B.

The combination of the selected grooves G having the depth Dg=A with the selected pre-pits PP having the depth Dp=B requires switching from the tracking method for the groove areas to the tracking method for the pre-pit areas and vice versa. Namely, the push-pull method is applied to a groove area while the DPD method is applied to a pre-pit area. Otherwise, effective tracking signals cannot be obtained.

The switching of tracking methods is desirable to be carried out within a very nallow area designated for this purpose. The reason is as follows: If the switching operation timing was shifted out of the tracking mode switching area, mismatched tracking, e.g., the DPD tracking would be conducted in a shallow groove area or the push-pull tracking would be conducted in a deep pre-pit area until the switching operation is accomplished. Consequently, the correct tracking control could not be realized.

The tracking mode switching area exists between the groove area and the pre-pit area. This area has a very short length of several microns. When the optical recording medium is rotated at a linear velocity of 1 to several meters per second, light beam passes this area in only a several microseconds. In other words, the tracking mode switching must be done for several microseconds.

Although only the tracking mode switching can be conducted in a moment by means of an electronic switch, it is still needed in practice to previously recognize which area, groove area or pre-pit area, is currently illuminated by the light beam. This operation normally requires several hundred microseconds. In other words, the tracking cannot be correctly controlled and hence is unstable until the tracking mode switching including the recognition of the currently illuminated area is completed. This causes misalignment of the mark M out of the center of the groove G when recording or a reproduction error from the deterioration of the reproduced signal when reproducing information. Furthermore, if any external disturbance is applied to the device, the beam spot is shifted from the target track, resulting, in the worst case, in recording or reproducing no information. Namely, there arises a problem of decreasing the stability and the reliability of the recording and reproducing apparatus.

Even if the beam spot position is fixed until the tracking mode switching is completed, no tracking control is conducted for that duration and hence the above problem remains unsolved.

The pre-pits normally carry non-erasable information such as address information, disc-related information, video information, music information etc. The grooves are normally vacant allowing the user to write desirable information thereon by using the recording/reproducing apparatus. In the combination of pre-pits with grooves, the user can normally write information in a groove area following a pre-pit containing an address. In this instance, there is still a problem that a groove area writable by the user is reduced by providing pre-pits of address information. This may be solved by an art disclosed in Japanese Laid-open Patent Publication No. 11-73686, whereby a land pre-pit (LPP) is provided in a land area between grooves and is read with a push-pull signal.

In such a disc consisting of pairs of a groove, a pre-pit and a land pre-pit, a portion, e.g., an internal circumferential area is a ROM area of non-erasable information such as disc-related information, video information and music information and another portion following the ROM area is a writable area (i.e., a groove area provided with LPPs) whereon the user can write any desirable information. The disc of this type can provide the user with ROM information prepared by the video and music program providers and allows the user to write information by own preferences.

As pointed out in the Japanese Laid-open patent Publication No. 11-73686, the LPP information must be obtained as a cross talk over recorded information and hence the obtainable signal quality is unstable. As seen in FIG. 6B, in the disc having land pre-pits (LPP) provided on a deep pre-pit area (depth B) and a shallow groove area (depth A), the LLPs neighboring to the deep pre-pit in comparison with the LPPs disposed in the groove area are inferior in its signal quality due to the cross-talk of the ROM information. Address information cannot be correctly read from that portion. Therefore, the disc of this type is practically constructed with the LPPs only in the groove area and with no LPP in the deep pre-pit area as shown in FIG. 6A to prevent inferior in its signal quality of ROM information.

However, the recording/reproducing apparatus, which usually reads address information from the LPPs, cannot recognize the address information until a light beam enters the groove area of the disc constructed as shown in FIGS. 6A and 6B. Since the recording device obtains address information and then conducts recording operation, it cannot record data on the top of the groove area of the disc. Namely, there may be an area lacking a recorded mark. This means a decrease in amount of writable information and the presence of a (gap) area with no RF-signal between a ROM area and a user area on the recoded disc. For a reproducing device that conducts tracking based on the differential phase detection (DPD) method, the gap area means absence of a tracking signal, whereby the beam may be out of the track in the area.

SUMMARY OF THE INVENTION

The present invention was made to solve the above-mentioned problems.

Accordingly, an object of the present invention is to provide an optical recording medium capable of obtaining large reproduced signals from recorded marks and pre-pits and large tracking signals in groove areas and pre-pit areas, and providing time allowance enough to switch over tracing mode between groove area and pre-pit area; a tracking method for recording and reproducing on and from the optical recording medium; and the optical recording and reproducing apparatus for using the optical recording medium. In other words, the present invention is intended to provide an optical recording medium that has the high data-reliability and high tracking accuracy and does not allow tracking error due to timing error of tracking-mode switching; a tracking method; and an optical recording and reproducing apparatus for recording and reproducing information on and from the optical recording medium.

Another object of the present invention is to provide an optical disc that has both a ROM area and a user area and has addresses recorded on LPPs on an optical disc, on which a recording device can perform recording with no gap between the ROM area and the user area to form continuous tracks composing the ROM area and the user area.

Another object of the present invention is to provide an optical recording medium comprising a substrate whereon tracks each comprising of at least grooves and pits deeper than or equal to the grooves are formed and areas of shallow pits are each provided between an area of the deep pits and an area of the grooves.

Another object of the present invention is to provide an optical recording medium, characterized in that a depth Dg of the groove, a depth Dsp of the shallow pit and a depth Ddp of the deep pit satisfy the following conditions:

$$Dg<\lambda/(8n),$$

$$\lambda/(8n)<Ddp<\lambda/(4n)$$

and $$Dg \leq Dsp < Ddp,$$

where λ is a wavelength of a light beam illuminating the optical recording medium and n is a refractive index of the substrate.

Another object of the present invention is to provide an optical recording medium, characterized in that at least one of the grooves or pit trains in an area of the pit is wobblingly formed.

Another object of the present invention is to provide an optical recording medium, characterized in that pre-pits is provided between the grooves.

Another object of the present invention is to provide a tracking method for optical recording media, characterized in that tracking is conducted based on a phase difference of reflected light in the areas of the deep pits and based on an average intensity distribution difference of reflected light in the areas of the groove and tracking is switched from the tracking based on the phase difference of the reflected light to the tracking based on the average intensity distribution difference of the reflected light and vice versa in the areas of the shallow pits.

Another object of the present invention is to provide a tracking method, characterized in that timing of switching the tracking is obtainable from address information recorded on the optical recording medium.

Another object of the present invention is to provide a tracking method, characterized in that timing of switching the tracking is obtainable from RF-signal amplitude information or RF-signal error information or wobble amplitude information.

Another object of the present invention is to provide an optical recording and reproducing apparatus for recording and reproducing information on and from any one of the optical recording media, which conducts tracking based on a phase difference of reflected light in the areas of the deep pits and tracking based on an average intensity distribution difference of reflected light in the areas of the groove and switches tracking mode from the tracking based on the phase difference of the reflected light to the tracking based on the average intensity distribution difference of the reflected light and vice versa in the areas of the shallow pits.

Another object of the present invention is to provide an optical recording and reproducing apparatus, characterized in that timing of switching the tracking mode is obtained from address information recorded on the optical recording medium.

Another object of the present invention is to provide an optical recording and reproducing apparatus, characterized in that timing of switching the tracking mode is obtained from RF-signal amplitude information or RF-signal error information or wobble amplitude information.

Another object of the present invention is to provide an optical recording medium comprising a substrate whereon tracks each consisting of at least an area of deep pits, an area of shallow groove and an area of shallow pits are formed and pre-pits are provided between neighboring tracks in the areas of the shallow groove and shallow pit.

Another object of the present invention is to provide an optical recording medium, characterized in that a part of the each area of the deep pits is replaced by an area of the shallow pits.

Another object of the present invention is to provide an optical recording and reproducing apparatus for recording and reproducing information on and from the optical recording media, which conducts receiving address information or timing information from pre-pits provided between the tracks and starts recording information on a head of a groove formed following the area of the shallow pits.

PREFERRED EMBODIMENT OF THE INVENTION

A preferred embodiment of the present invention will be described below in detail with reference to the accompanying drawings.

Figure 7:
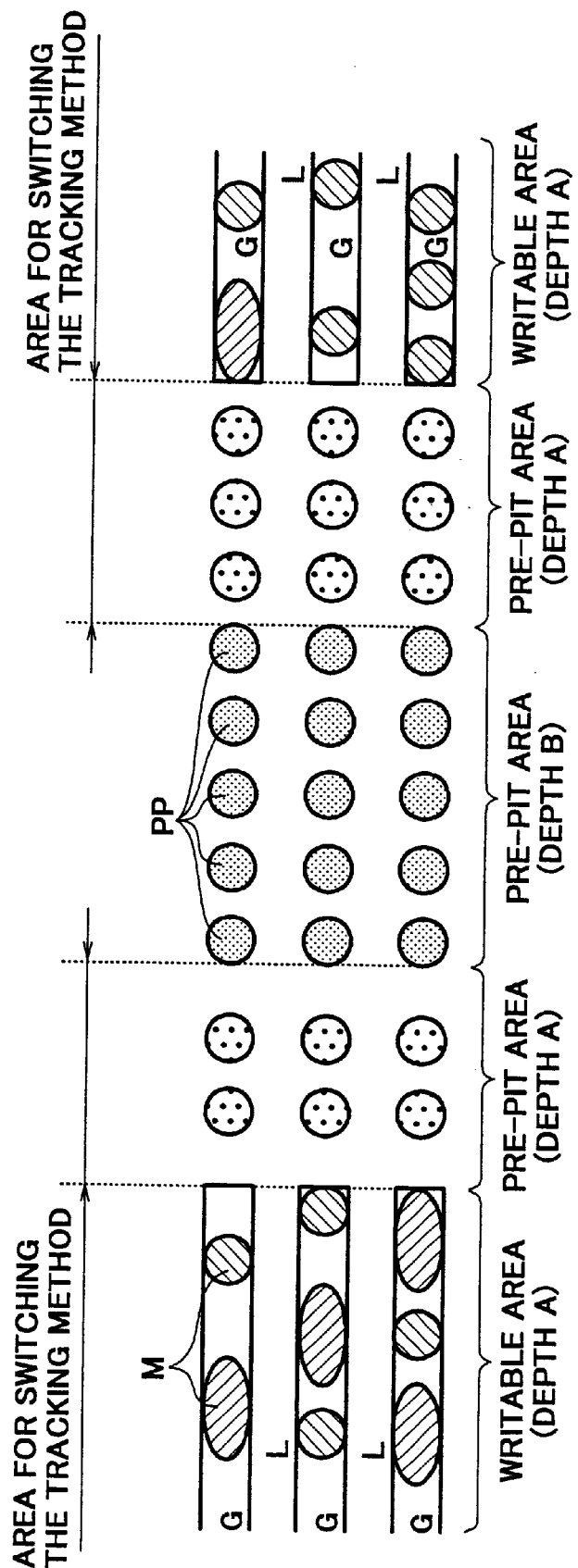
FIG. 7 schematically illustrates an optical recording medium according to the present invention.

FIG. 7 is a schematic view showing a structure of an optical recording medium according to an embodiment of the present invention.

Similarly to the conventional example described before, the embodiment consists of experiments made with a number of optical discs having a track pitch (inter-groove distance) of 0.74 microns and differ from each other by their groove depth Dg and pre-pit depth Dp by using an optical system composed of a laser emitting light beam having a wavelength 650 nm and an objective lens NA0.6.

The groove width (G) and the pre-pit width (pp) were 0.35 microns. The recording layer made of phase-change material InAgSbTe was applied. The recording and reproducing were conducted by rotating each disc at a linear velocity of 3.5 m/s.

As shown in FIG. 7, the embodiment is featured in that an area of pre-pits having a depth Dp=A is provided between an area of grooves having a depth Dg=A and an area of pre-pits having a depth Dp=B. In this instance, each disc was prepared with a 700 micron long pre-pit area of depth Dp=A. The depths A and B were close to 20 nm and 100 nm respectively, as described before with reference to FIGS. 2 and 3.

Figure 4:
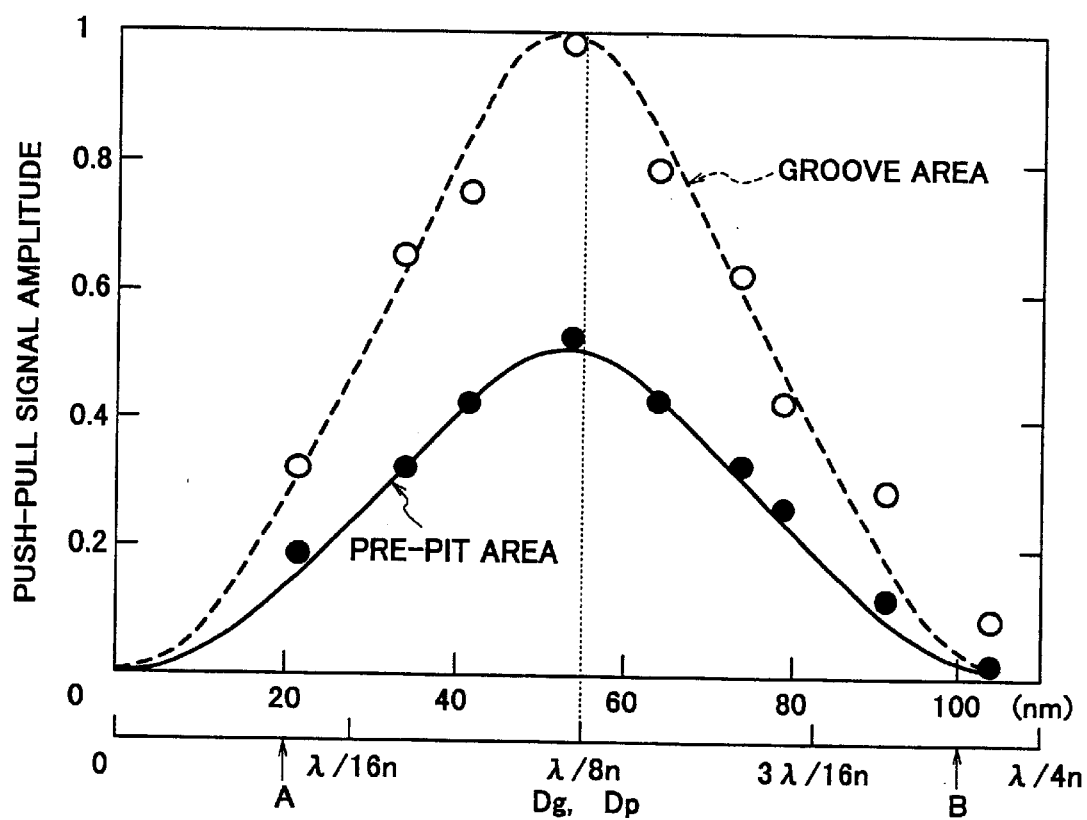
FIG. 4 is a graph showing a groove-depth-dependent amplitude characteristic of a push-pull signal obtained from a groove of depth Dg and a pre-pit-depth-dependent amplitude characteristic of a push-pull signal obtained from a pre-pit of depth Dp.
Figure 5:
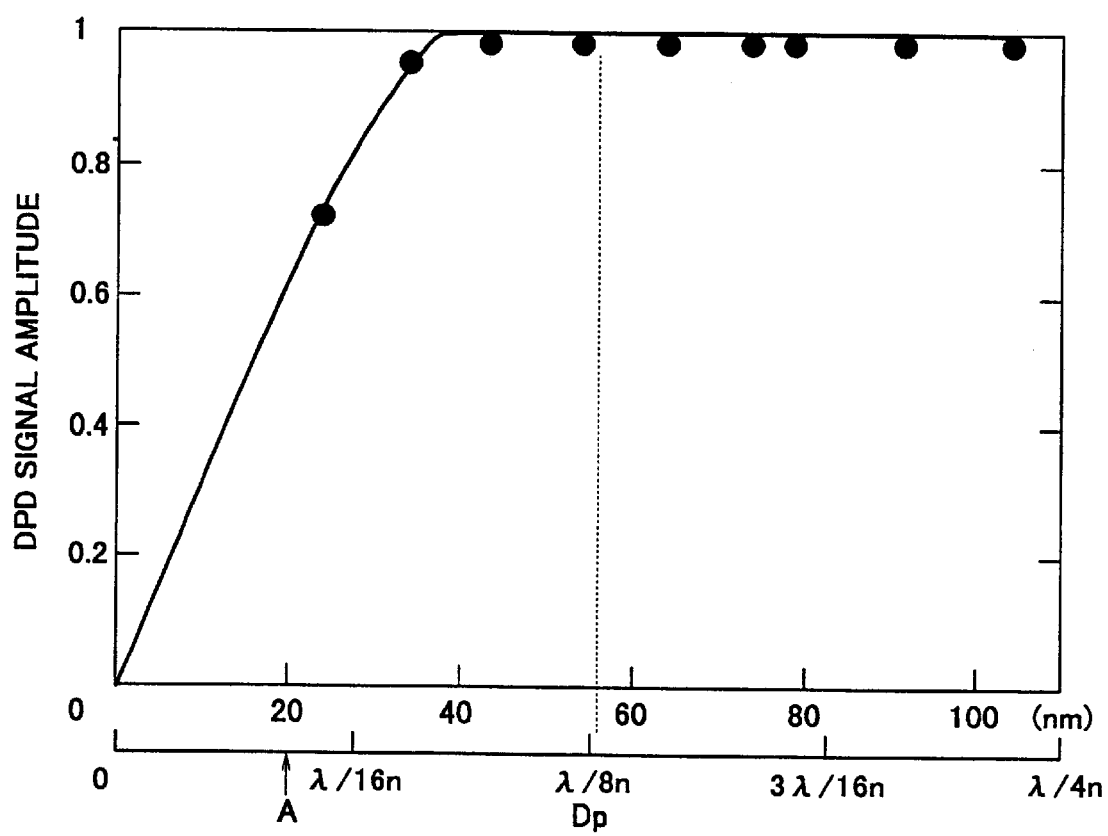
FIG. 5 is a graph showing characteristic amplitude of a DPD signal obtained from a pre-pit of depth Dp, which depends upon the depth of the pre-pit.
Figure 6A:
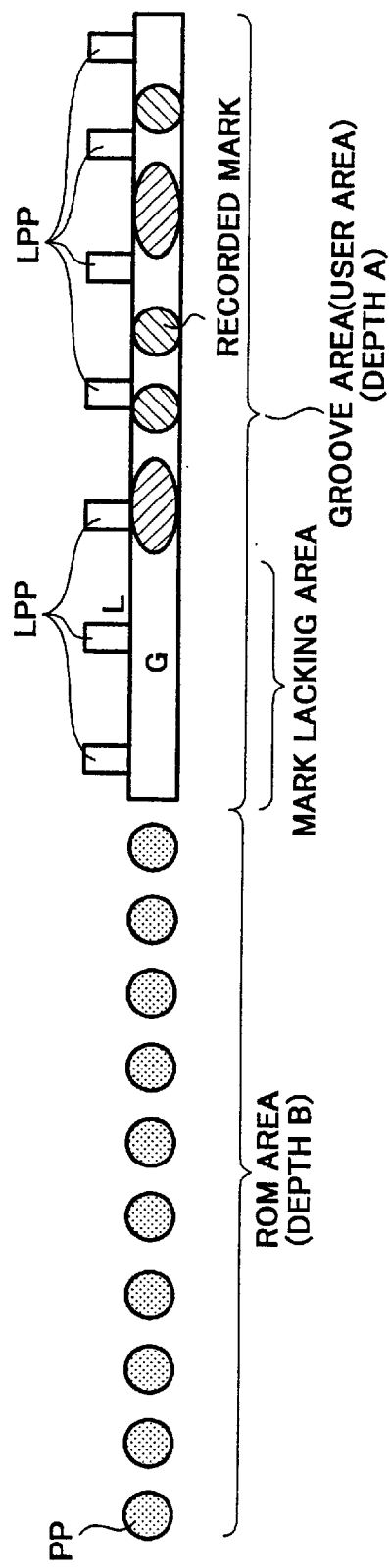
FIG. 6 illustrates the state of applying LPP to a disc having ROM areas and groove areas.
Figure 6B:
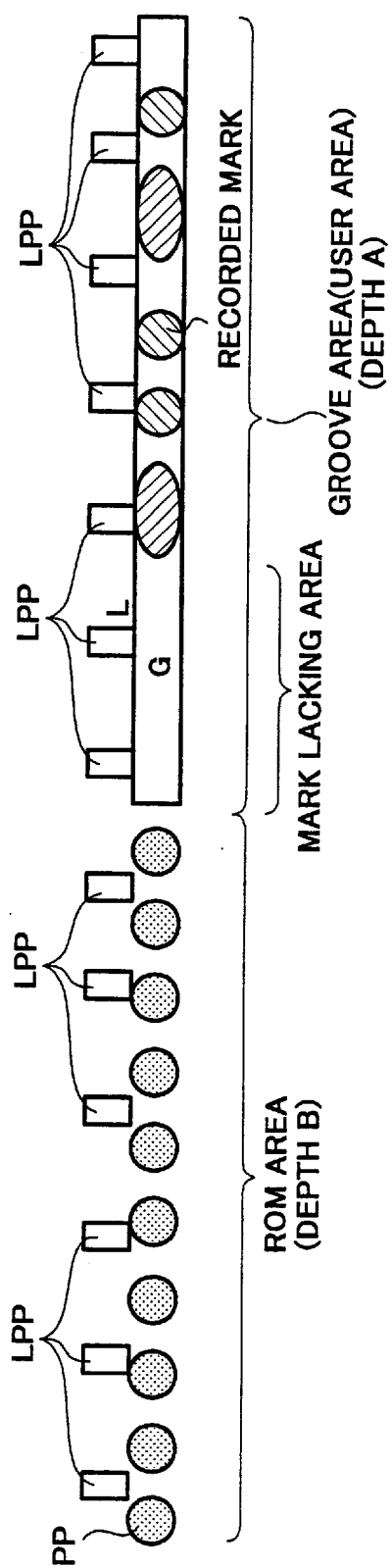

As seen from FIGS. 4 and 5, both a push-pull signal and a DPD signal from an area of pre-pits having a depth Dp=A have amplitudes large enough to be tracked by the push-pull method and the DPD method respectively.

Figure 1:
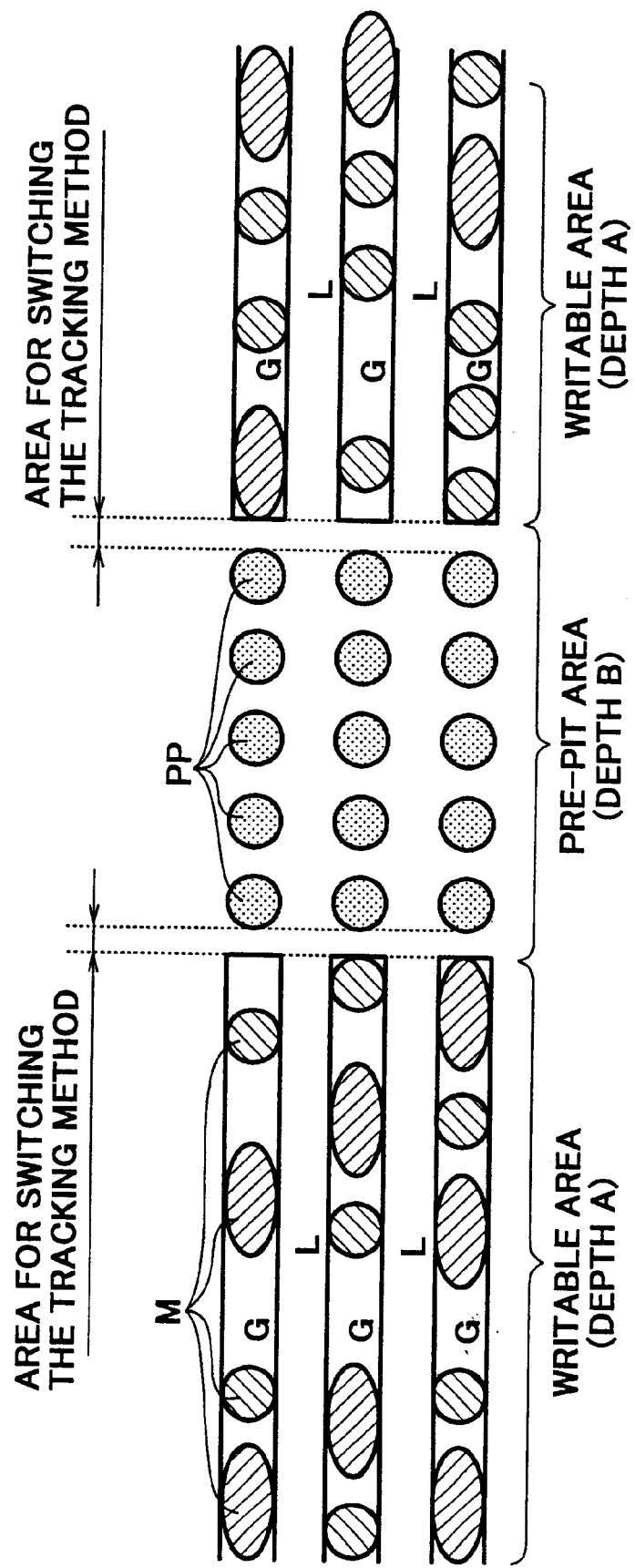
FIG. 1 is schematic construction view of a conventional optical recording medium.

Accordingly, switching of the tracking method may be accomplished in a pre-pit area having the pre-pit depth Dp of A. This area is formed of a large length (700 microns in length in this instance) while the corresponding area of the prior art example shown in FIG. 1 is of several microns in length.

This area-length corresponds to 200 microseconds calculated at a linear velocity of 3.5 m/s, which enables a recording and reproducing apparatus to have enough time to acquire the timing of switching the tracking method. In other words, an allowance can be provided for designing the recording/reproducing apparatus used for recording and reproducing information on and from the optical recording medium.

Furthermore, it is possible to conduct the tracking control by either the push-pull method or the DPD method during the switching process. This eliminates the possibility of tracking error and improves the reliability of the apparatus.

If it takes more time to switch the tracking mode, the pre-pit area having depth Dp of A may be correspondingly elongated.

Figure 8:
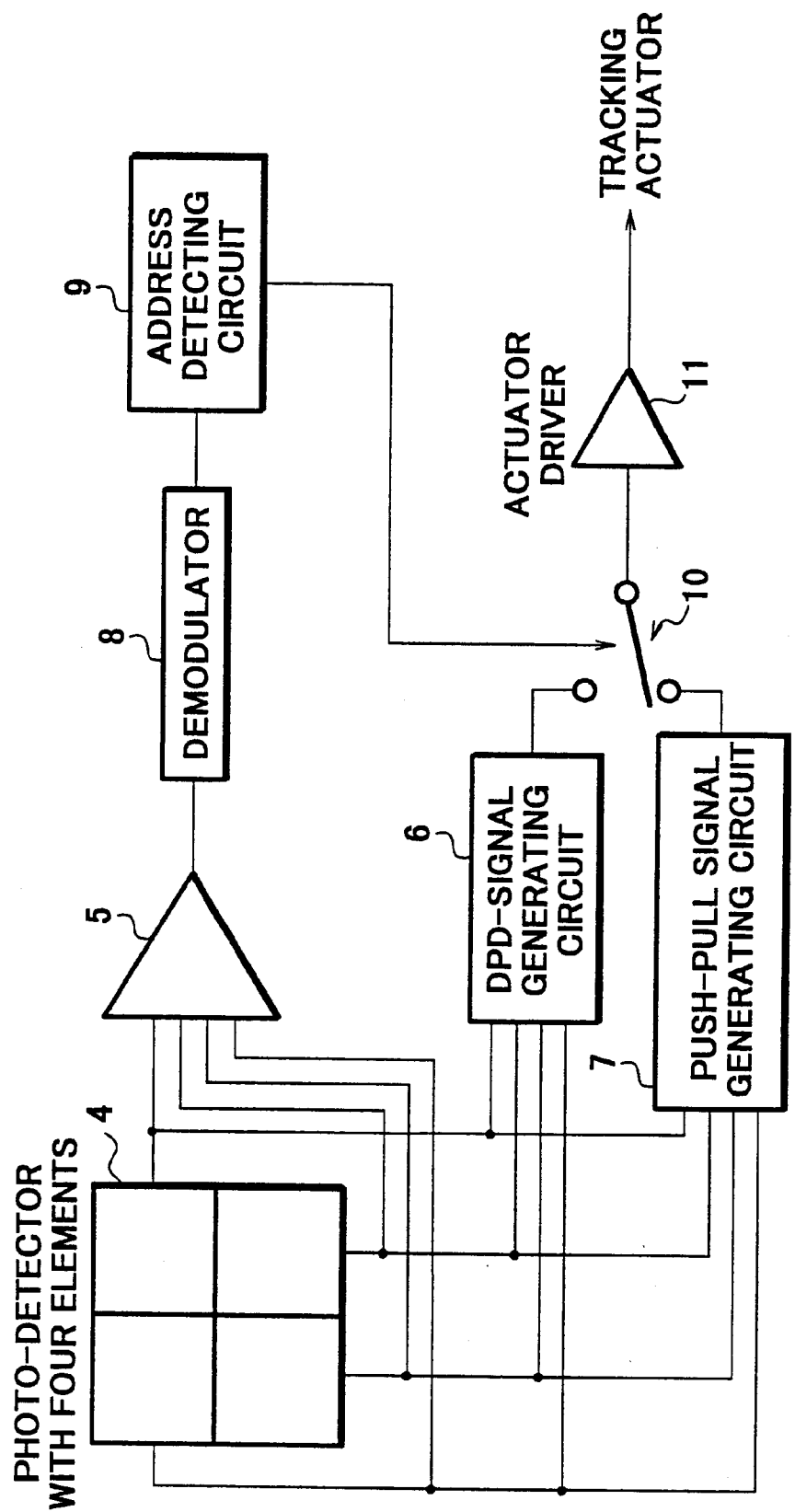
FIG. 8 is a block diagram showing an example of a tracking servo system for recording and reproducing information on the optical recording medium of FIG. 7.

FIG. 8 is a block diagram of an exemplary servo system for tracking the optical recording medium shown in FIG. 7.

The tracking servo system is capable of switching the tracking mode while a light beam moves from a pre-pit area of depth Dp=B to a groove area of depth Dg=A through a pre-pit area of depth Dp=A.

The reflected light from the disc is collected on detector 4 with four elements. Output signals of the each four elements are summed by a sum amplifier 5 to form a so-called RF signal representing a magnitude of reflected light quantity. The RF signal is transferred through a demodulator 8 to an address detection circuit 9, a DPD signal generating circuit 6 for generating a DPD tracking signal by detecting a differential phase or change in phase of the reflected light and a push-pull signal generating circuit 7 for generating a push-pull signal based on an average distribution of the reflected light in the transverse direction of the track.

The address information is usually recorded in the form of pre-pit on the deep pre-pit area of depth Dp=B. This allows the address detection circuit 9 to detect the address of the area. The address detection circuit 9 detects the end of the deep pre-pit area of depth Dp=B based on the detected address information and actuates a switch 10 to switch the tracking mode from the DPD method to the push-pull method. An obtained tracking signal is transferred to an actuator-driver 11 to drive a tracking actuator.

The circuit structure shown in FIG. 8 is designed to detect the end of an area of deep pits (i.e., the beginning of a following area of shallow pre-pits) from address information. In case where a shallow pre-pit area appears following a groove area, the end of the groove area can be recognized by address information recorded on the groove area and tracking method is changed in the shallow pre-pit area for tracking in the following deep pre-pit area.

In practice, address information is usually recorded on marks M previously formed on the groove area, which can be detected by the address detection circuit 9.

The address detection circuit 9 thus constructed can reliably detect the beginning of a shallow pre-pit of an optical recording medium having a known format. This assures high reliability of switching the tracking method.

This is a common merit for an optical recording medium, a method of switching the tracking mode on the optical recording medium and a recording/reproducing apparatus using the same method and the same recording medium.

Even if no mark M is previously formed in the groove area, necessary address information can be provided by forming each groove G as slightly wobbled or forming a specific pre-pit PP on a land L between grooves G. The beginning of the following shallow pre-pit area can be thus detected. The recording medium, the tracking method and the recording and reproducing apparatus can possess the same advantageous feature of switching tracking method.

In this instance, a practical detection circuit is constructed by adding the output of the push-pull signal generating circuit 7 to the demodulator 8 in the construction shown in FIG. 8. However, the format of address information to be provided by the wobble of the groove and the pre-pit PP on a land L may be different from that of the address information provided by the original pre-pit PP and the mark on a groove G and, hence, the demodulator 8 must comply with the both formats.

The push-pull signal generating circuit 7 usually generates a push-pull signal based on an average of reflected light of a beam illuminating a recoding surface of the optical recording medium and, therefore, possesses, much or less, the low-pass characteristic for eliminating high-frequency components by pre-pits and marks. This characteristic of the circuit may affect the detection of the address information provided by the wobble of the groove G or the pre-pit PP on the land L. In this instance, it is needed to provide the demodulator 8 with a signal extracted from a part before a low-pass characteristic stage of push-pull signal generating circuit 7.

The thus constructed circuitry enables detection of the beginning of a shallow pre-pit area with no mark formed on a groove G, ensuring reliable switching of the tracking method.

Figure 9:
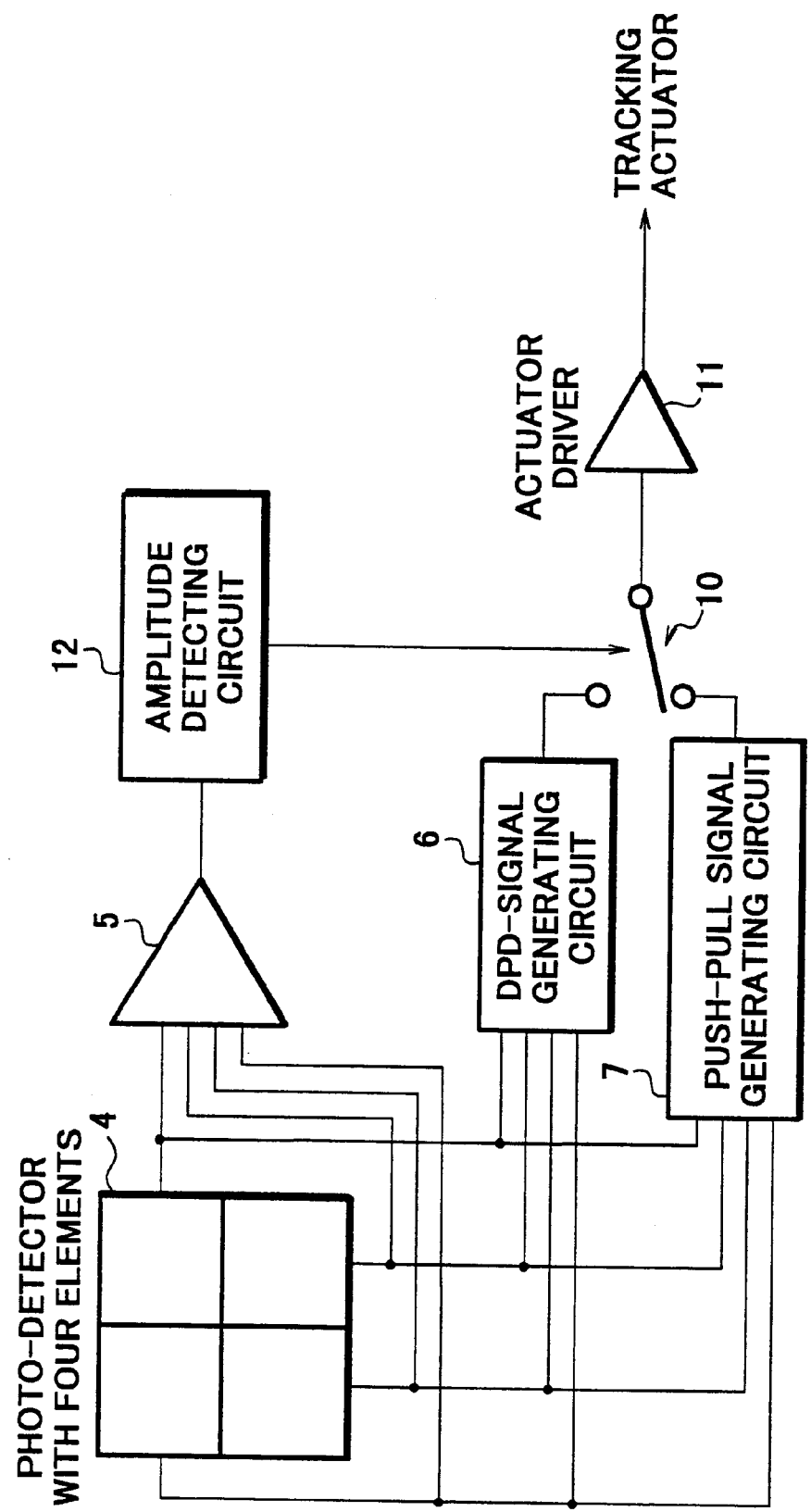
FIG. 9 is a block diagram showing another example of a tracking servo system for recording and reproducing information on the optical recording medium of FIG. 7.

FIG. 9 is a block diagram of another exemplary servo system for tracking on the optical recording medium of FIG. 7.

An alternative method of detecting the beginning of a shallow pre-pit area is to detect a change in amplitude of the RF signal. The tracking servo system shown in FIG. 9 is based on the above concept and realized in practice by using an amplitude detection circuit 12 instead of the demodulator 8 and the address detection circuit 9 in the system construction of FIG. 8.

In this instance, when a light beam moves on an optical recording medium (optical disc) from a deep pre-pit area to a groove area through a shallow pre-pit, a RF-signal may have a large amplitude in the deep pre-pit but it has a small amplitude in the shallow pre-pit area. The beginning of the shallow pre-pit can be recognized by detecting a change in amplitude of the RF signal with the amplitude detection circuit 12. The tracking method can be switched at that time.

On the contrary, when the light beam moves on the optical disc from the groove area with no mark M formed therein to the deep pre-pit area through the shallow pre-pit area, a RF-signal appears when the beam arrives at the beginning of the shallow pre-pit area. The beginning of the shallow pre-pit area can be thus detected by monitoring the occurrence of the RF-signal.

On the optical disc with a mark M recorded on the groove, a RF-signal from the mark M usually has an amplitude apparently larger than that of a RF-signal from the shallow pre-pit PP. Therefore, the RF-signal amplitude degreases when the beam reaches the shallow pre-pit area.

As is apparent from the above description, timing of switching the tracking mode may be obtained by detecting the occurrence of the RF-signal amplitude or a decrease in amplitude of the RF-signal by the amplitude detection circuit 12.

For optical recording media of the type (such as phase change type or dye type) whereon marks M are recorded in a groove area as a change of its reflectivity, a large tracking signal enabling the DPD tracking method can be obtained from the marks in the groove area. In this case, it is possible to detect the marks by the DPD method without switching the tracking method to the other method.

The above system enables the recording/reproducing apparatus to detect the beginning of a shallow pre-pit area by using output signal of a RF-signal generating circuit that is its essential unit for recording/reproducing information on/from the optical recording media. This can save the number of components and expenses of the tracking method switching circuit.

The following is an alternative method for detecting a shallow pit area in an area for switching the tracking method.

For example, an optical recording medium having a groove area, a shallow pre-pit area and a deep pre-pit area formed in succession thereon is further designed to have the slightly wobbled groove G and a not-wobbled train of pits in the shallow pre-pit area. On the other hand, a recording/reproducing apparatus using the above optical recording medium is designed to monitor the push-pull signal. When the apparatus records or reproduce information on the optical recording medium, the push-pull signal becomes not to reflect a wobble component of the groove as soon as the beam just left the groove area and entered the shallow pre-pit area. The tracking method can be switched to the suitable one at the timing when detecting no existence of a wobble component in the push-pull signal.

The above system is capable of detecting the beginning of the shallow pre-pit area, regardless of presence/absence of marks recorded in the groove G, and switching the current tracking method to the method suitable for tracking in the following deep pre-pit area.

On the contrary, the optical recording medium having a wobbled train of the pre-pits PP in the pre-pit area thereof (instead of the groove) may be used. In this instance, a sequence of a deep pre-pit area, a shallow pre-pit area and a groove area may cause a push-pull signal to decrease its amplitude in the deep pre-pit area and increase its amplitude in the shallow pre-pit area, thereby correspondingly increasing the amplitude of a wobble component in the push-pull signal from the shallow pre-pit area. Accordingly, the beginning of the shallow pre-pit area can be detected by detecting the increased amplitude of the wobble component in the push-pull signal. At this moment, the current tracking method may be switched to the method suitable for tracking in the following groove area.

The above system can use a simple detection circuitry in comparison with the system for detecting the beginning of the shallow pre-pit area based on the address information.

Although the depth Dg of a groove G area and the depth Dsp of a shallow pre-pit PP are equal to A in the shown embodiment, it is obvious from the concept of the invention that the groove depth Dg and the shallow pre-pit depth Dsp may be different from each other and the shallow pre-pit PP may have any suitable depth Dsp so that both the push-pull signal and the DPD signal may be large enough for tracking.

Figure 3:
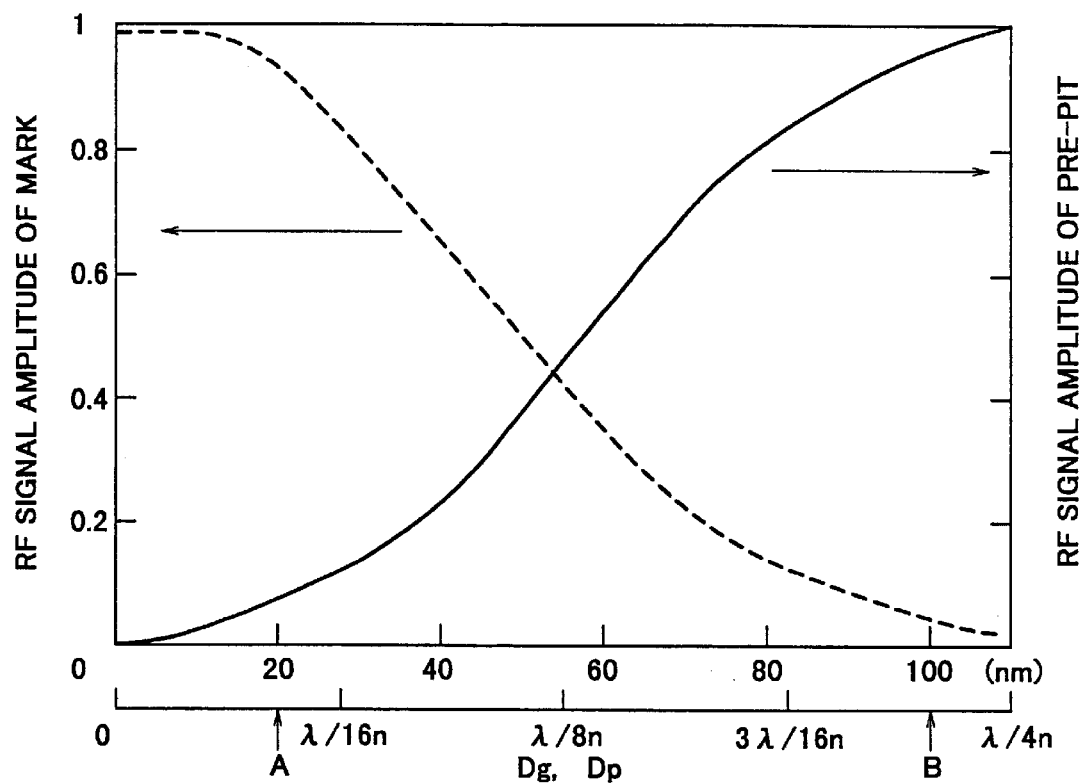
FIG. 3 is a graph showing a groove-depth-dependent amplitude characteristic of a RF signal obtained from marks recorded in a groove of depth Dg and a prepit-depth-dependent amplitude characteristic of a RF signal obtained from a pre-pit of depth Dp.

The groove depth Dg and the pre-pit depth Dp on an optical recoding medium according to the present invention may be expressed in the general relations to be satisfied:

(1) The groove depth Dg must be selected from such a range of FIGS. 3 and 4 that both a reproduced signal from a mark M and a push-pull signal are compatible with each other. It is desirable to be: $Dg<\lambda/(8n)$.

Figure 2:
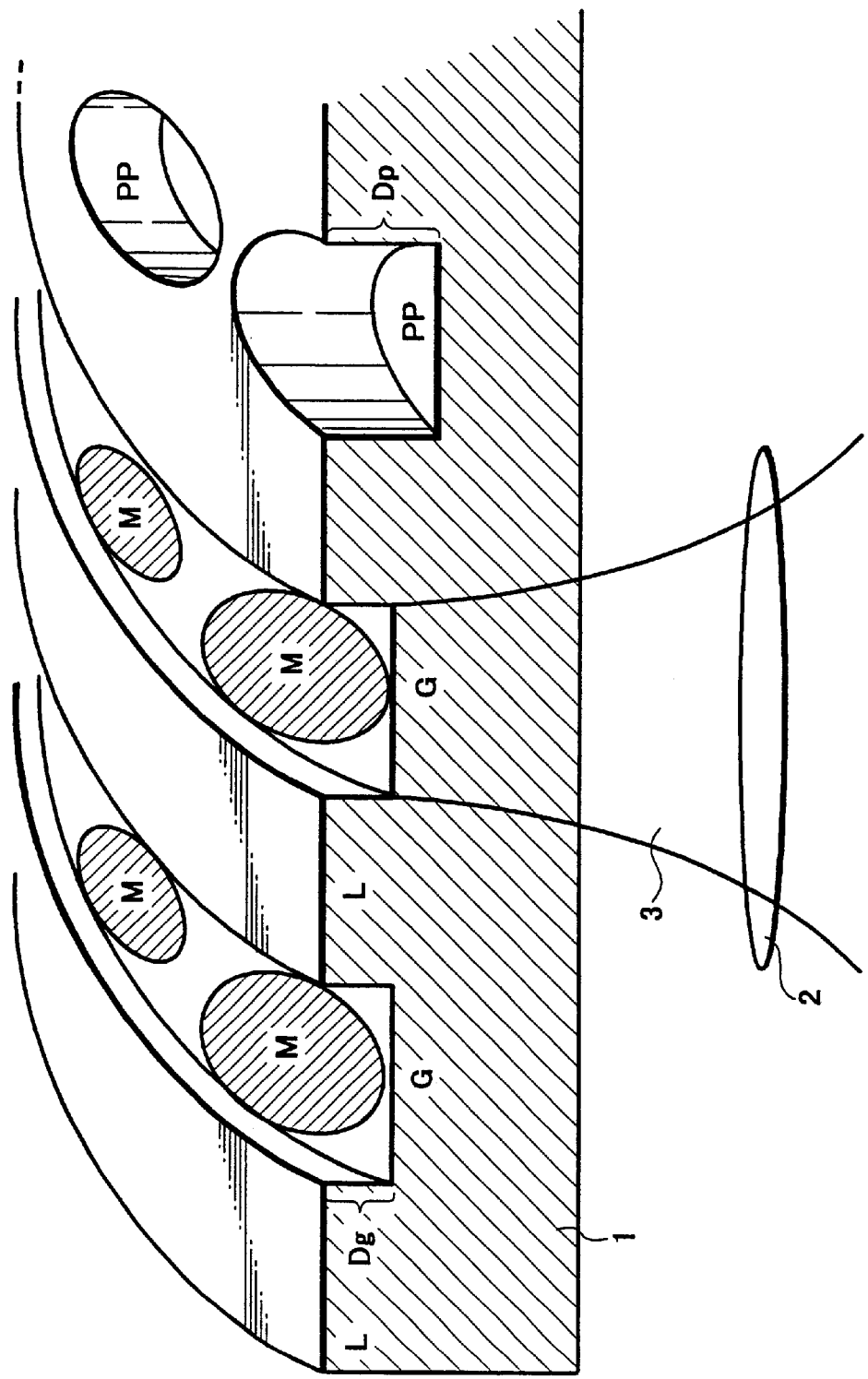
FIG. 2 is three-dimensional representation of the conventional optical recording medium.

(2) The depth Ddp of the deep pre-pit must be selected from such a range of FIGS. 2 and 4 that both a reproduced signal from a pit and a DPD signal are compatible with each other. It is desirable to be: $\lambda/(8n)<Ddp<\lambda/(4n)$.

(3) The shallow pre-pit depth Dsp is then set to a value between the values of the deep pre-pit depth Ddp and the groove depth Dg to make the push-pull signal (FIG. 4, FIG. 5) and the DPD signal be compatible with each other. Therefore, three depths are desirable to be: $Dg \leq Dsp < Ddp$.

The optical recording medium having its groove and pit depths selected according to the above-described relations is capable of obtaining a suitable quality of a reproduced signal from each mark in each groove, a sufficient amplitude of a push-pull signal for tracking therein, a suitable quality of a RF-signal of a pre-pit train and a sufficient amplitude of a DPD signal for tracking therein. The optical recording medium also provides a shallow pre-pit area sandwiched between the groove area and the deep pre-pit area, wherein tracking can be conducted by any tracking signal (push-pull method or DPD tracking method) and hence the current tracking signal (method) can be switched to the other tracking signal (method) suitable for the following groove area or the deep pre-pit area with a sufficient time allowance.

The use of the optical recording medium improves the reliability of switching the tracking method as well as the reliability of the operation of the optical recording and reproducing apparatus.

In the embodiment, the push-pull method was adopted as a tracking method suitable for the groove area and the shallow pre-pit area. Alternatively, it is also possible to apply the differential push pull (DPP) method since the dependence of its signal amplitude on the groove depth and the pit depth is similar to that shown in FIG. 4 for the push-pull signal.

As described before, the present invention has as its object the provision of an optical recording medium consisting of a ROM area and a user area and having address information in a LPP, which medium is capable of accurately recording information thereon with no gap at the boundary between the ROM area and the user area to form a continuous track through the ROM area and the user area after completion of recording thereon. The essence of this concept may be summarized as follows: In an optical recording medium having a pit area wherein only reproducible information (ROM information) has been recorded in the form of pits and a groove area for recording information in the form of recorded marks, a shallow pit area is further provided between the pit area and groove area and pre-pits representing address information and timing reference information have been separately formed between neighboring tracks in the shallow pit area and the groove area. The address information and timing information (aligning and synchronizing information) necessary for recording data can be obtained from the shallow pit area, thereby information can be accurately recorded from the top of the groove area following the shallow pit area. This prevents the occurrence of a non-recorded portion (gap) on the top of the groove area due to the timing error or synchronization error and hence eliminates the possibility of losing the recording capacity of the medium.

A practical example of application of the present invention will be described below in detail with reference to the accompanying drawings. In this embodiment, the experiments were conducted first on a number of optical discs having different groove depths (Dg) and pre-pit depths (Dp) at a fixed tack pitch 0.74 microns (a distance between grooves) by using an optical system consisting of a laser emitting light of 650 nm and an objective lens NA0.6. The groove width and the pre-pit width were of 0.35 microns. The recording layer of the disc is formed of phase change material InAgSbTe. Information was recorded and reproduced on and from the disc rotating at a linear velocity 3.5 m/sec.

The result of the experiments of discs having different groove depths (Dg) and different pit depth (Dp) are shown in FIG. 3 as the relationship between the groove depths (Dg) and amplitudes of signals of the 0.3 micron long marks written in the groove and the relationship between the pre-pit depths (Dp) and the pre-pit signal amplitudes.

The graph of FIG. 3 indicates that the amplitude of the reproduced signal from the mark recorded in the groove increases and the SIN ratio is thereby improved as the groove depth (Dg) decreases. It is preferable to decrease the groove depth (Dg) for obtaining the signal having an improved S/N ratio. This feature is effective in particular for high-density discs.

However, the groove depth cannot be decided in view of only the S/N ratio of the reproduced signal of the recoded mark. Namely, tracking of a light beam 3 focused on groove is needed to orderly record information in the form of marks in the grooves and then to correctly reproduce the information from the marks. For this reason, the depth of the grooves must be decided in view of an amplitude characteristic of a reproduced signal from the mark and an amplitude characteristic of tracking signal (i.e., a push-pull signal) obtained on the basis of an average quantity distribution of reflected light components in a direction perpendicular to a direction of the grooves.

FIG. 4 is a graph showing the relationship between the groove depths and the amplitudes of the push-pull signals reproduced from the groove area, and the relation ship between the pre-pit depths and the amplitudes of the push-pull signals reproduced from the pre-pit area. As seen from the graph, the maximal amplitude of the push-pull signal can be obtained when the groove depth Dg or the pre-pit depth Dp is equal to $\lambda/8n$. This means that the grooves G having the depth Dg of $\lambda/8n$ are desired to obtain push-pull signals having a value large enough to achieve precise tracking. However, in view of the amplitude of the reproduced signal obtained from the mark as described with reference to FIG. 3, it is preferable to select the groove depth Dg being smaller than $\lambda/8n$ (for example, a depth value indicated by A in FIGS. 3 and 4 is about 20 nm). This is a compromise solution for the amplitude of the push-pull signal and the S/N ratio of reproduced signal from the mark. In the above term, $\lambda$ designates the laser light wavelength and n designates a refractive index.

The depth of the deep pit is now examined. It can be found from the relationship between the pre-pit depth Dp and the amplitude of the reproduced signal of the pre-pit (FIG. 3) that the amplitude of reproduced signal from the pre-pit can take a maximal value at the pre-pit depth Dp of $\lambda/4n$ and decreases in a shallower pre-pit. The depth of the deep pit is therefore desired to be set near to the value $\lambda/4n$ from the viewing point of improving the RF signal quality (S/N ratio). However, it is noticed that the optical disc device for recording information thereon requires reproduction of so-called ROM information recorded on the deep pits.

For this reason, the pit depth must be set in due consideration of obtaining a sufficient tracking servo signal (push-pull signal) according to the push-pull method used mainly by the optical disc device for recording information thereon. According to the graph of FIG. 4, the push-pull signal becomes small at the pit depth of about $\lambda/4n$ and hence the depth value B (about 80 nm in FIGS. 3 and 4) may be selected as the deep pit depth to make the reproduced signal of the above-described pit compatible with the push-pull signal.

The selection of the above-mentioned depths Dp and Dg enables the recording device to conduct stable tracking in the deep pit area and the groove area by using the push-pull method and obtain large amplitudes of reproduced signals from both pre-pits and marks. It is of course possible to select the deep pit depth of about $\lambda/4n$ for the optical disc device for recording information if the disc has no need for tracking in the deep pit area by using the push-pull signal.

The selection of the depth of the shallow pit is discussed below.

The shallow pit area is provided, not for reproducing information thereof, but for providing a so-called "approach" necessary for starting recording of information just on the top of the following groove area. When the groove area has pre-pits (i.e., land pre-pits "LPP") formed between tracks to provide address information and timing information necessary for recording information, the preceding shallow pit area must have the same pre-pits (LPPs) enabling the recording of the information just from the top of the following groove area. The depth of the shallow pre-pit must be decided to be such that ensures sufficient reproduction of the LPP information. As described before, the LPP is read as a crosstalk signal overlaid on the recorded information and hence the LPP signal may not have a good quality enough to be read if a reproduced signal of the recorded information has a large amplitude value.

At the same time, the shallow pit area must be adapted to the tracking servo system. If the shallow pit area is of a very small depth, a good LPP signal quality can be obtained but a push-pull signal cannot be produced, making it impossible to do tracking by the push-pull method that is mainly applied for the optical disc device for recording information thereon. In practice, the depth of the shallow pit may be equal to or slightly larger than the depth of the groove. The upper limit value is estimated at about $\lambda/8n$ according to the result of our experiments.

Figure 10:
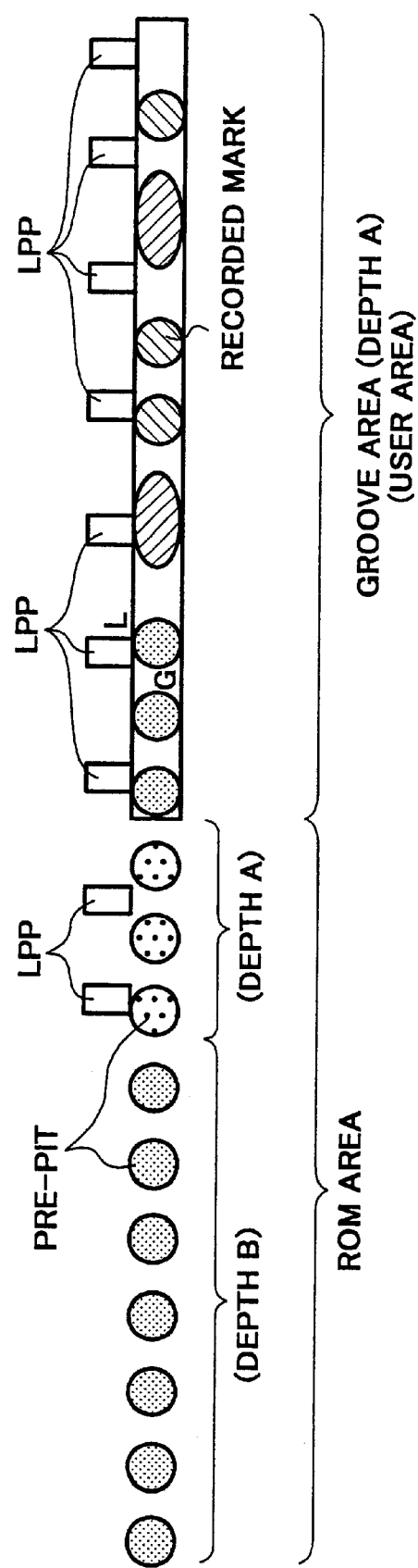
FIG. 10 schematically illustrates another exemplified optical recording medium according to the present invention.

In view of the above discussions, we prepared an optical disc constructed as shown in FIG. 10, wherein a shallow pit area having the depth A is provided between a deep pit area having the depth B and a groove area having the depth A. The LPPs are provided in a groove area and pre-pits area having the depth A. A laser beam is scanned from the left to the right on the disc shown in FIG. 10. As seen from FIG. 3, the shallow pit area of depth A may produce a small RF signal and a relatively large LPP signal. Thus address information contained in the LPP can be easily read to adjust timing of recording and establish the synchronization. The recording device can get the address and establish the timing in the stage before the beam enters into the groove area. Consequently, the device can start recording information just on the top of the groove.

After completion of recording, the optical disc has continuous tracks formed thereon by the deep pits, shallow pits and the recorded mark in grooves. FIG. 5 shows a relationship between the depth of pre-pits and the DPD signal amplitude. A DPD signal having a small value of amplitude can be produced from the shallow pit whose depth is equal to or more than the groove depth.

As described above, all the deep pit area, the shallow pit area and the groove area containing record marks formed therein allow tracking by DPD method. Hence the reproducing device having a DPD tracking servo system can continuously track through these areas on the optical disc and can reliably reproduce the information therefrom.

The above optical recoding medium has no LPP in the deep pit area, eliminating the possibility of decreasing the quality of the S/N ratio or misreading of the reproduced signal of so-called ROM information recorded in the form of pits by the interference of the LPP signal. On the other hand, the shallow pit area contains LPPs similar to those formed in the groove area and hence can provide address information and information necessary for adjusting the timing and establishing the synchronization, thereby enabling the recording device to start recording information just on the top of the groove area following the above shallow pit area. This means that the optical recording medium can be effectively used from the top of its groove areas, eliminating loss of the recording capacity. Furthermore, the capacity of the optical recording medium can be further increased by replacing a part of a deep pit area by a shallow pit area (without forming a separate shallow pit area on the optical recording medium). This format may be applied when the same information is repeatedly recorded as deep pits and some of the repetitions can be eliminated with no problem.

A method and an optical disc device for recording on the optical recording medium according to the present invention can record information just on the top of a groove area by obtaining address information and timing information from land pre-pits (LPP) formed between neighboring tracks in a shallow pit area and a groove area, thus obtaining the optical recording medium whereon information has been recorded with no gap (unused part) using the full recording capacity. At the same time, the optical recoding medium allows continuously tracking all over the deep pit area, shallow pit area and groove area by the DPD method and, hence, the recorded information on the optical recording medium can be suitably reproduced by optical disc reproducing devices that uses only the DPD tracking method or mainly a DPD tracking servo system.

In the above-described embodiment, the optical system including a laser emitting light of wavelength 650 nm and an objective lens NA0.6 was used. However, it is obvious that the effect of the present invention is not limited by the optical system. Furthermore, the groove depth and the pre-pit depth are not limited to the values A and B shown in the embodiment and a variety of different groove-and-pit depths in a specified range may be of course applied in the scope of the present invention. Although the above described disc has a shallow pre-pit whose depth is equal to that of the groove, it is also obvious that both depths may be different from each other and may be such that enables an LPP signal to be reproduced.

As described above, an optical disc system according to an aspect of the present invention is capable of obtaining large reproduced signals from a recorded mark and a pre-pit respectively and a large tracking signal in both a groove area and a pre-pit area, thereby offering the high reliability of records and precise tracking on the disc.

The optical disc system can provide a sufficient time allowance for switching the tracking mode to the tracking method suitable for the groove area or to the tracking method suitable for pre-pit area, eliminating the possibility of tracking error due to timing-error of switching the tracking method. Namely, the stable and reliable optical recording/reproducing apparatus can also be created.

Although an optical disc storing records in groves only has been described as an embodiment, the present invention can be applicable to a so-called "land-groove recording" optical disc that allows recoding information both in grooves and lands.

An optical recording medium according to an aspect of the present invention has a shallow pit area between a deep pit area and a groove area and has pre-pits (LPP) between neighboring tracks in the shallow pit area and the groove area. In the deep pit area, no LPP is provided in order not to cause so-called "cross talk" that is the inter-track pre-pit information overlaid on ROM information. The ROM information is thus protected from being misread.

In the shallow pit area and the groove area, land pre-pits representing address information and reference information for timing and synchronization adjustment are formed between the neighboring tracks. It is therefore possible to start recording information just on the top of the groove area and to continuously track the deep pit area, shallow pit area and recorded groove area by the DPD tracking method.

Furthermore, the shallow pit area can be tracked by any of the DPD tracking method and the push-pull tracking method. Namely, the optical recording medium is adapted to use in both a recording device for recording information on a unused groove area by mainly using the push-pull method and a reproducing device for reproducing information recorded on the pit area and the groove area by mainly using the DPD method.

An optical recording medium according to another aspect of the present invention replaces a part of a deep pit area by shallow pits. Thus a groove area, (i.e., a user area capacity) does not decrease as compared with the case of only adding a shallow pits.

According to the present invention, it is possible to record information just on and after the top of a groove area without forming a gap between the pit area and the groove area to form continuous tracks of records on the optical recoding medium, which can be easily tracked and reproduced by a recording/reproducing device by using the DPD method. Namely, an optical recoding/reproducing apparatus of high stability and high reliability can be created.

What is claimed is:

1. An optical recording medium comprising a substrate whereon tracks each comprising of at least grooves and pits deeper than or equal to the grooves are formed and areas of shallow pits are each provided between an area of the deep pits and an area of the grooves.

2. An optical recording medium as defined in claim 1, wherein a depth Dg of the groove, a depth Dsp of the shallow pit and a depth Ddp of the deep pit satisfy the following conditions:

$Dg < \lambda/(8n)$, $\lambda/(8n) < Ddp < \lambda/(4n)$ and $Dg \leq Dsp < Ddp$, where $\lambda$ is a wavelength of a light beam illuminating the optical recording medium and n is a refractive index of the substrate.

3. An optical recording medium as defined in claim 1 or 2, wherein at least one of the grooves or pit trains in an area of the pits is wobblingly formed.

4. An optical recording medium as defined in claim 1 or 2, wherein pre-pits is provided between the grooves.

5. A tracking method for optical recording media as defined in claim 1, wherein tracking is conducted based on a phase difference of reflected light in the areas of the deep pits and based on an average intensity distribution difference of reflected light in the areas of the grooves and tracking is switched from the tracking based on the phase difference of the reflected light to the tracking based on the average intensity distribution difference of the reflected light and vice versa in the areas of the shallow pits.

6. A tracking method as defined in claim 5, wherein timing of switching the tracking is obtainable from address information recorded on the optical recording medium.

7. A tracking method as defined in claim 5, wherein timing of switching the tracking is obtainable from RF-signal amplitude information or RF-signal error information or wobble amplitude information.

8. An optical recording and reproducing apparatus for recording and reproducing information on and from any one of the optical recording media as defined in claim 1, which conducts tracking based on a phase difference of reflected light in the areas of the deep pits and tracking based on an average intensity distribution difference of reflected light in the areas of the grooves and switches tracking mode from the tracking based on the phase difference of the reflected light to the tracking based on the average intensity distribution difference of the reflected light and vice versa in the areas of the shallow pits.

9. An optical recording and reproducing apparatus as defined in claim 8, wherein timing of switching the tracking mode is obtained from address information recorded on the optical recording medium.

10. An optical recording and reproducing apparatus as defined in claim 8, wherein timing of switching the tracking mode is obtained from RF-signal amplitude information or RF-signal error information or wobble amplitude information.

11. An optical recording medium comprising a substrate whereon tracks each consisting of at least an area of deep pits, an area of shallow grooves and an area of shallow pits are formed and pre-pits (LPP) are provided between neighboring tracks in the areas of the shallow grooves and shallow pits.

12. An optical recording medium as defined in claim 11, wherein a part of the deep pits area is replaced by the shallow pits.

13. An optical recording and reproducing apparatus for recording and reproducing information on and from the optical recording media as defined in claim 11 or 12, which conducts receiving address information or timing information from pre-pits (LPP) provided between the tracks and starts recording information on a head of a groove formed following the area of the shallow pits.

14. An optical recording medium comprising a substrate whereon tracks each comprising at least grooves and pits deeper than or equal to the grooves are formed and areas of shallow pits are each provided between an area of the deep pits and an area of the grooves, wherein information can only be recorded within the tracks.

15. An optical recording medium as defined in claim 14, wherein a depth Dg of the groove, a depth Dsp of the shallow pit and a depth Ddp of the deep pit satisfy the following conditions:

$$Dg < \lambda/(8n),$$

$$\lambda/(8n) < Ddp < \lambda/(4n)$$

and $$Dg \leq Dsp < Ddp,$$

where $\lambda$ is a wavelength of a light beam illuminating the optical recording medium and n is a refractive index of the substrate.

16. An optical recording medium as defined in claim 14, wherein at least one of the grooves or pit trains in an area of the pits is wobblingly formed.

17. An optical recording medium as defined in claim 14, wherein pre-pits are provided between the grooves.

18. A tracking method for optical recording media as defined in claim 14, wherein tracking is conducted based on a phase difference of reflected light in the areas of the deep pits and based on an average intensity distribution difference of reflected light in the areas of the grooves and tracking is switched from the tracking based on the phase difference of the reflected light to the tracking based on the average intensity distribution difference of the reflected light and vice versa in the areas of the shallow pits.

19. A tracking method as defined in claim 18, wherein timing of switching the tracking is obtainable from address information recorded on the optical recording medium.

20. A tracking method as defined in claim 18, wherein timing of switching the tracking is obtainable from RF-signal amplitude information or RF-signal error information or wobble amplitude information.

21. An optical recording and reproducing apparatus for recording and reproducing information on and from any one of the optical recording media as defined in claim 14, which conducts tracking based on a phase difference of reflected light in the areas of the deep pits and tracking based on an average intensity distribution difference of reflected light in the areas of the grooves and switches tracking mode from the tracking based on the phase difference of the reflected light to the tracking based on the average intensity distribution difference of the reflected light and vice versa in the areas of the shallow pits.

22. An optical recording and reproducing apparatus as defined in claim 21, wherein timing of switching the tracking mode is obtained from address information recorded on the optical recording medium.

23. An optical recording and reproducing apparatus as defined in claim 21, wherein timing of switching the tracking mode is obtained from RF-signal amplitude information or RF-signal error information or wobble amplitude information.

* * * * *